United States Patent Office 2,832,470
Patented Apr. 29, 1958

2,832,470

PROCESS FOR FRACTIONATING MIXTURES OF SOLID PARTICLES OF DIFFERENT POROSITIES

Kornelis Rietema, Amsterdam, Netherlands, assignor to Shell Development Company, New York, N. Y., a corporation of Delaware No Drawing. Application May 17, 1955
Serial No. 509,100

Claims priority, application Netherlands June 30, 1954

6 Claims. (Cl. 209—172.5)

This invention relates to a process for separating mixtures of solid particles of different porosities and the same, or practically the same skeletal density into fractions having different porosities. It is particularly applicable to the separation of mixtures of cataylst particles, e. g., powdered catalyst used in catalytic cracking and other hydrocarbon conversion processes using the fluidized catalyst technique, into fractions consisting of more active and less active particles.

It is known to separate mixtures of particles having essentially the same skeletal density but different porosities such, for instance, as so-called equilibrium cracking catalyst, through the use of a partition liquid having a specific gravity intermediate the apparent densities of the porous particles; see, for example the following patents: U. S. 2,483,372, 2,631,968, 2,643,215, 2,688,401 and 2,699,256.

If such particles are contacted with a partition liquid, whether it be water or an aqueous solution or an organic liquid such as a halogenated hydrocarbon or alcohol, the liquid immediately penetrates and fills the pores. If the skeletal densities of the particles are essentialy the same, it is therefore obvious that all of the particles have the same buoyancy in the liquid and the desired separation is not possible.

It is true that if the porous particles have been fluxed and subjected to very high temperatures they may become glazed, thereby sealing the pores against pentaration by a liquid or even by a gas such as helium. It is also true that in a few instances a small percentage of such particles has been found in equilibrium cracking catalyst and when so found they may be separated with a partition liquid which fills the accessible pores of the unglazed particles. This is, however, the exceptional case and is not a separation on the basis of the different intrinsic porosities between the particles such as desired and accomplished by the method of this invention.

In order to effect separation on the basis of different porosities, it is essential that the partition liquid be prevented from filling the pores. In the past this has been done by one of two methods. According to the first method, the pores are sealed against liquid penetration by treating the particles with a material which repels the liquid. For instance, the particles may be provided with a surface film of a water repellent silicone following which the particles may be separated in an aqueous partition liquid. This method, disclosed and claimed in U. S. Patent No. 2, 631,968, is capable of giving good results but it involves several steps, is difficult to carry out, and is more suited for laboratory separations than for commercial application.

The second method, disclosed in U. S. Patent No. 2,643,215 is simpler. According to this method, the pores of the particles are first filled with a liquid which is lighter than the partition liquid and preferably immiscible therewith, after which the separation is effected in the usual way. For instance, in the preferred case the pores are first filled with water and the separation is then made in a heavy halogenated hydrocarbon partition liquid. There are at least two disadvantages to this method. The first is that a heavier, more costly partition liquid is required. The reason for this will be apparent from the following consideration: The silica-alumina cracking catalysts, for example, have a skeletal density of the order of 2.3 g./cc. Suppose, for example, that two particles of such catalyst having average pore volumes of 0.3 and 0.4 cc./g. are to be separated. The apparent average particle density, $d_A$ is related to the average skeletal density, $d_S$, the pore volume $V_p$, and the density of the medium, $d_M$, which fills the pores, as follows:

$$d_A = (1 + V_p \cdot d_M) : (1/d_S + V_p)$$

Therefore, when the pores are filled with air, their respective apparent average particle densities are 1.36 g./cc. and 1.20 g./cc., or a difference of 0.16 g./cc. When the pores are filled with water, their respective apparent average particle densities are 1.77 and 1.68, or a difference of 0.09 g./cc., thus requiring a partition liquid having a higher density than when the pores are filled with air. The other disadvantage is that the apparent densities of the particles upon which the separation depends is largely erased; thus, in the above example, when the pores are filled with gas, the difference in apparent densities of the particles is 0.16 g./cc., whereas, when the pores are filled with water the difference in apparent densities is only 0.09 g./cc.

The first of these disadvantages can be overcome by the method disclosed in my copending application, Serial No. 500,527 filed April 11, 1955 in which instead of a heavy halogenated hydrocarbon, an aqueous suspension of a finely divided solid, e. g., barytes, is used as the partition liquid. In this case, water from the suspension penetrates the pores and the density differences are therefore small. The second difficulty still exists. It has now been found that such porous particles may be much more advantageously separated into fractions of different porosities by means of a liquid separating medium, the density of which during the separation is intermediate the apparent densities of the porous particles to be separated if the separation is effected in a particular manner whereby the pores remain filled with gas during the separation.

In order to prevent penetration of liquid into the pores of the material to be separated before the separation is completed and thereby to insure that the separation takes place while the pores are still filled with gas, the contact time of the material to be separated with the liquid separating medium up until the time the separation has been completed must be very short. In spite of the fact that the total time allowed is less than one second, and preferably less than 0.1 second, it is found that the separation may be very effectively carried out. The preferred method is to effect a separation in a vortex chamber, i. e., a cyclone separator, the solid particles to be separated being introduced tangentially in a stream of air or other gaseous medium and the liquid separating medium (partition liquid) also being introduced tangentially. The solid particles to be separated and the liquid separating medium are preferably introduced into the vortex chamber through separate tangential inlets. However, a common tangential inlet can be used if it is so arranged that the contact of the particles to be separated with the liquid separating medium does not take place until very shortly before the point where the mixture is introduced into the vortex chamber.

In order to effect the separation in the necessary short time required to insure that the pores of the particles remain filled with gas, it is necessary that a vortex chamber of very small dimensions be used. Very small vortex chambers give the optimum results and are for that reason preferred. However, it is also possible to use somewhat larger vortex chambers and still obtain good results in many cases, depending upon the structure and size of the solid particles to be separated and the nature of the liquid separating medium.

When powdered cracking catalysts such as used in the fluidized catalytic cracking process are to be separated into more active and less active fractions, the total contact time of the catalyst particles with the liquid separating medium from the point of initial contact to the point where the separation has been effected should generally be less than 0.1 second, e. g., 0.05 second, or even less. The catalyst particles in this case vary in size from about 20 microns up to about 150 microns in diameter. If contact times longer than those specified are allowed, the gas present in the pores of the catalyst particles is entirely or largely expelled by penetration of the liquid.

A multicone consisting of a number of small cyclone separators combined to form one unit was found especially suitable for carrying out the process according to the invention on a technical scale. Such a multicone has the advantage of a larger capacity while the dimensions of the individual vortex chambers may be kept sufficiently small to afford the short contact times required.

Any heavy liquid such as halogenated hydrocarbons, e. g., carbon tetrachloride, ethylene dibromide, and mixtures thereof, which is inert with respect to the porous particles to be separated and does not dissolve them to any appreciable extent and which has a suitable specific gravity during the separation, may be used as the heavy partition liquid.

Although homogeneous liquids such as halogenated hydrocarbons, sulfuric acid, aqueous salt solutions, and the like, may be used quite effectively it has been found advantageous to use suspensions of solid materials of such size that the suspension behaves essentially as a homogeneous liquid with respect to the solid particles to be separated. To satisfy these requirements, the product $d_1^2 \Delta \rho_1$ of the smallest particles of the material to be separated should be greater than $d_2^2 \Delta \rho_2$ of the largest particles of the material making up the suspension, wherein $d_1$ and $d_2$ are the respective diameters of the particles and $\Delta \rho_1$ and $\Delta \rho_2$ are the differences, respectively, between the densities of the particles in question and the liquid used in making the suspension. Suitable suspensions may be made with various solid materials which have a specific gravity of two or more and are substantially inert with respect to the liquid component of the suspension. Examples of suitable materials are barytes, galena, iron oxide, fluorite, etc.

By choosing the nature of the solid material used to make up the suspension and the concentration of such material, the suspension can be adjusted to any specific gravity in the necessary and desired range. In making this adjustment, account should be taken of the thickening of the suspension and increase in specific gravity which occurs as a result of the centrifugal action in the separation stage. As the density of the suspension is increased, e. g., by increasing the amount of solids used to make the suspension, the percentage of the lighter catalyst fraction is increased with a corresponding decrease in the percentage of the heavier catalyst fraction, and vice versa. Thus, by adjusting the density of the suspension any cut point between the two fractions may be obtained.

The gaseous medium with which the pores of the solid particles to be separated in the process according to the invention should remain entirely or almost entirely filled during separation, and which is conveniently the same as that by means of which these particles are introduced into the cyclone, may be any gas or mixture of gases which is inert with respect to the solid particles and the liquid separating medium used. In most cases air will be used for the purpose, but if desired other gases, such as nitrogen, carbon dioxide, carbon monoxide, hydrogen, methane, and the like, may also be used instead. In general a moderate superatmospheric pressure, e. g. from 1 to 5 atm. of the gaseous medium by means of which the solid particles are introduced into the cyclone, is sufficient, but if desired even higher pressures may be used. The use of a fairly high pressure not only has the advantage of allowing the catalyst suspension to be introduced into the vortex chamber at a desired high velocity, but it has an additional beneficial effect. Thus, the tendency of the compressed gas in the pores to escape, when the pressure is reduced upon entering the vortex chamber, hinders penetration of liquid into the pores.

Since in the process according to the invention the pores of the particles to be separated remain filled with gas during the separation, the difference in apparent density between these particles is hardly decreased and remains considerably greater than when the continuous phase is able to penetrate into the pores. As a result the present method of separation is more selective, so that a sharper separation is effected, this being shown in the case of the separation of catalyst particles by the fact that the active particles separated have a greater activity than those obtained when the pores of the catalyst particles do not remain filled with gas during separation. Moreover, in the process according to the invention the specific gravity of the separating liquid or suspension may be lower, which is an economic advantage.

Although the present process is primarily important for separating mixtures of fine catalyst particles into an active and a less active fraction, it is not restricted to this; it may be also used successfully for separating other porous material, such as adsorbents, certain ion exchangers and the like, into fractions of different apparent density.

The process according to the invention and the technical effect obtained thereby will be further illustrated by means of the following examples which relate to the fractionation of a so-called equilibrium cracking catalyst, consisting of a mixture of active and less active particles, which is drawn off from the regenerator of the cracking unit in fluidized catalyst catalytic cracking using a synthetic silica-alumina catalyst.

Example I

A mixture of the cracking catalyst particles, the particle size of which varied from 30 to 150 $\mu$, was led tangentially into a cyclone with air under a pressure of about 5 atm., an aqueous barytes suspension with a particle size less than 7$\mu$ being also tangentially introduced into the cyclone at the same time, but separately.

In order to demonstrate the favorable effect of the air in the pores, the contact time of the catalyst particles and air together with the barytes suspension in the cyclone was varied by modifying the dimensions of the cyclone.

Practically all air was found to have been expelled from the pores when the contact time was about ⅛ of a second or more, the specific gravity (S. G.) of the separating suspension required to separate 50 percent by weight of the catalyst as an active fraction then being 1.66.

When, however, in accordance with the invention, the contact time in the cyclone was so reduced that the pores remained filled with air during the separation, for which purpose the contact time had to be reduced to less than 0.1 second, a lower specific gravity of the barytes suspension could be chosen in order to obtain a separation of 50 percent by weight, as is shown by the following table.

| Contact Time in Seconds | Dimensions of Cyclone in cm. | | Required S. G. of the separating suspension |
|---|---|---|---|
| | Diameter | Length | |
| ⅛ | 3 | 15 | 1.66 |
| 0.04 | 1 | 6 | 1.61 |
| 0.02 | 1 | 3 | 1.54 |

The improvement obtained with respect to activity, with the use of short contact times in the cyclone (0.04 and 0.02 second), was 30–40% greater than that obtained with a contact time of ⅛ second.

*Example II*

The same catalyst mixture as in Example I was separated into fractions, a similar series of tests being carried out as in Example I, with the difference, however, that instead of a barytes suspension, a mixture of carbon tetrachloride and ethylene dibromide was used as the separating medium, and 60 percent by weight of the catalyst was separated as the active fraction. In this case also, with the tests carried out with a short contact time in the cyclone (0.04 and 0.02 second), the air remaining in the pores, the required specific gravity of the separating medium was lower than when the contact time in the cyclone was sufficiently long to expel the air from the pores during separation, as is shown by the following table.

| Contact time in seconds | Required S. G. of the separating medium |
| --- | --- |
| ⅛ | 2.0 |
| 0.04 | 1.88 |
| 0.02 | 1.70 |

I claim as my invention:

1. A process for the separation of a mixture of finely divided solid particles of differing porosity but essentially the same skeletal density into fractions of lesser and greater porosity, comprising filling the pores of the particles to be separated with a gas under superatmospheric pressure and while thus filled with gas mixing the particles with a partition liquid having a density intermediate the apparent densities of the particles to be separated and subjecting the particles in said partition liquid to a centrifugal field and separately withdrawing from said centrifugal field two streams, one containing the more porous particles in such liquid and the other containing the less porous particles in said liquid, the process being further characterized in that the time of contact of said particles with said liquid from the time of initial contact to the time of said separation is sufficiently below one second that the pores of the solid to be separated remain substantially filled with said gas.

2. A process according to claim 1, wherein the centrifugal field is in a vortex zone, the solid particles to be separated are introduced tangentially to the vortex zone by means of an inert gas, and the partition liquid is introduced separately and tangentially into the vortex zone.

3. A process according to claim 1, wherein the partition liquid is a suspension of finely divided solid particles of such dimensions that the suspension behaves as a homogeneous liquid with respect to the solid particles to be separated.

4. A process according to claim 1, wherein the mixture of finely divided solid particles to be separated is a catalyst of active and less active particles.

5. A process according to claim 4, wherein the partition liquid is an aqueous suspension of finely divided barytes.

6. A process according to claim 1, wherein the pores of the particles to be separated are filled with the gas under a superatmospheric pressure of from 1 to 5 atmospheres and introduced as such into the centrifugal field wherein the pressure is substantially atmospheric.

References Cited in the file of this patent

UNITED STATES PATENTS

| | | |
| --- | --- | --- |
| 1,149,463 | Pardee | Aug. 10, 1915 |
| 1,194,399 | Lenders | Aug. 15, 1916 |
| 1,756,488 | Kellog | Apr. 29, 1930 |
| 1,756,497 | Warren | Apr. 29, 1930 |
| 1,871,121 | Holmes | Aug. 9, 1932 |
| 2,206,574 | Pearson | July 2, 1940 |
| 2,642,185 | Fontien | June 16, 1953 |
| 2,643,215 | Hoge | June 23, 1953 |